LEEPER & KIDDER.
Wheel-Cultivator.
No. 31,393.
Patented Feb. 12, 1861.
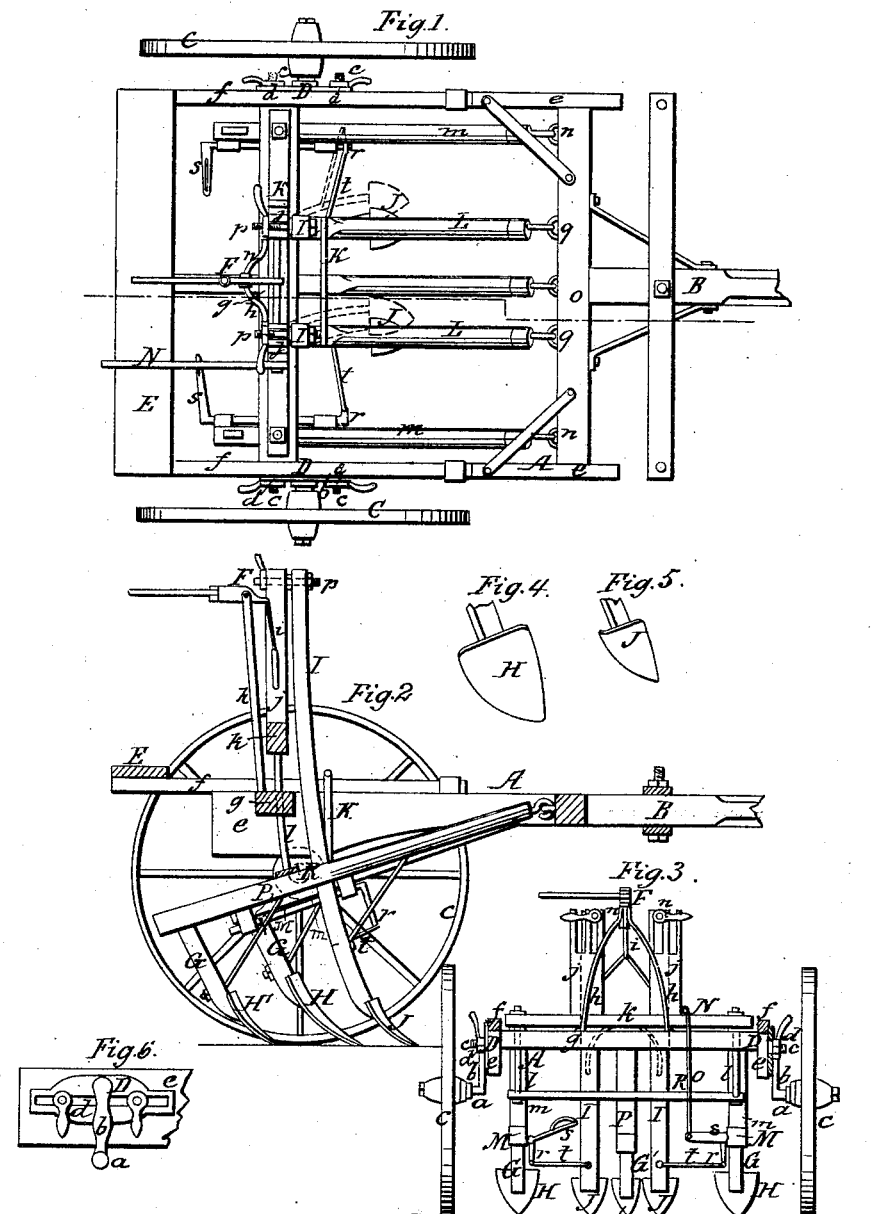
Witnesses:
J. W. Coombs
P. S. Spencer
Inventor:
R. A. Leeper
Z. B. Kidder
per Munn & Co
Attys.

UNITED STATES PATENT OFFICE.

R. A. LEEPER AND Z. B. KIDDER, OF SAN JOSÉ, ILLINOIS.

IMPROVEMENT IN CULTIVATORS.

Specification forming part of Letters Patent No. 31,393, dated February 12, 1861.

*To all whom it may concern:*

Be it known that we, R. A. LEEPER and Z. B. KIDDER, of San José, in the county of Mason and State of Illinois, have invented a new and Improved Cultivator; and we do hereby declare that the following is a full, clear, and exact description of the same, reference being had to the annexed drawings, making a part of this specification, in which—

Figure 1 is a plan or top view of our invention; Fig. 2, a side sectional view of the same, taken in the line $x\,x$, Fig. 1; Fig. 3, a back elevation of the same; Figs. 4 and 5, detached views of shares; Fig. 6, a detached view of one of the wheel-axles, showing its attachment to the frame of the machine.

Similar letters of reference indicate corresponding parts in the several figures.

To enable those skilled in the art to fully understand and construct our invention, we will proceed to describe it.

A represents a rectangular frame, to the front end of which a draft-pole, B, is attached. C C are the wheels on which the frame A is mounted. The wheels are fitted on arms $a\,a$, which are attached at right angles to vertical bars $b\,b$, the upper ends of which are firmly secured to slotted plates D D. The plates D are slotted horizontally, and are secured to the sides of the frame A by screws $c$ and nuts $d$, the screws passing through the side pieces, $e\,e$, of the frame A and through the slots of the plates D D, as shown clearly in Fig. 6, the slots of the plates being sufficiently long to admit of a certain degree of adjustment of the bars $b\,b$, and consequently of the wheels C. By this adjustment of the wheels C the frame A may be balanced at all times, both when the driver is on and off from it.

The driver's seat E is attached to the back parts of elastic bars $f\,f$, which are secured to the upper surfaces of the side pieces, $e\,e$, and project behind them a certain distance. The position, therefore, of the driver's seat renders important the adjustment of the wheels, as described, for the weight of the driver on the seat E will throw an empty balance-frame very much out of a state of equipoise, and some provision is necessary to compensate for this unequal loading or disposition of weight on the frame A.

On the back traverse-bar, $g$, of the frame A there are secured two curved bars, $h\,h$, the upper ends of which are connected together by a bolt, which serves as a fulcrum for a lever, F. The front end of this lever F is connected by a chain, $i$, to two uprights, $j\,j$, the lower ends of which are connected to a bar, $k$, which rests on the traverse-bar $g$. To each end of the bar $k$ there is attached a rod, $l$, and these rods pass through the traverse-bar $g$ and are attached to beams $m\,n$, the front ends of which are connected by staples and eyes or universal joints $n$ to the front traverse-bar, $o$, of the frame A.

To the back parts of the beams $m\,m$ inclined feet or standards G are attached, each of which has a share, H, secured to it. The upper ends of the uprights $j\,j$ are slotted vertically, and the upper parts of curved bars I are attached thereto by screw-bolts $p$. This manner of attaching the bars I to the uprights $j$ admits of a certain degree of vertical adjustment of the former. The lower ends of the bars I have shares J attached to them, and the bars are connected by a curved or bow-shaped rod, K. Each bar I has a beam, L, attached to it, and the front ends of these beams are connected to the traverse-bar $o$ of the frame A by universal joints $q$, which are precisely similar to the joints $n$ of the beams $m$.

To the inner side of each beam $m$ there is attached a crank-shaft, M, each shaft having two crank-arms, $r\,s$, at right angles to each other, and one being at the front and the other at the back end of the shaft. The front crank-arms, $r$, of the shafts M are connected to the lower parts of the bars I by rods $t$, as shown in Fig. 3, and to the back crank-arm, $s$, of one of the shafts M a lever, N, is connected by a rod, O, said lever being attached to one of the uprights $j$.

From the above description it will be seen that as the implement is drawn along the bars I I (and consequently the shares J) may be moved laterally in the arcs of circles of which the bolts $p\,p$ form the centers. The bars I are moved by actuating-lever N. The shares J may be termed the "working-shares," as the row of plants is between them, and the shares by this lateral adjusting movement may be adjusted or manipulated so as to operate in a perfect manner. The shares H serve as pulverizers and weed-eradicators. All the shares may be raised simultaneously from the earth when required by actuating-lever F. The rod K is made of bow form, so that it may clear the plants.

In case the implement should be required for dragging in wheat, an extra beam, P, may be placed between the bars I I, provided with a share, H', and foot G', and attached to the front cross-bar, o. This extra beam P may have a bar, R, attached to it at right angles, said bar having its ends fitted on the rods l and resting on the bearings m m.

Having thus described our invention, what we claim as new, and desire to secure by Letters Patent, is—

1. The employment of the laterally-swinging bars I I and shares J, in combination with the uprights j, beams L L, crank-shafts M, rods t k, and lever N, in the manner herein shown and described.

2. The arrangement, with the above-named parts, of the arms a a, bars b b, and slotted plates D, and frame A, seat E, lever F, beams m m, uprights j, and standards G, in the manner and for the purposes herein shown and described.

R. A. LEEPER.
Z. B. KIDDER.

Witnesses:
JOHN H. KIDDER,
WM. A. BROWN.